(12) United States Patent
Hedayatpour et al.

(10) Patent No.: US 7,827,494 B1
(45) Date of Patent: Nov. 2, 2010

(54) LAYOUT MANAGEMENT USING DATA-DESCRIPTIVE META LANGUAGE DOCUMENTS

(75) Inventors: Ramin Hedayatpour, San Francisco, CA (US); Scott Dreier, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 802 days.

(21) Appl. No.: 11/102,614

(22) Filed: Apr. 8, 2005

(51) Int. Cl.
*G06F 3/00* (2006.01)

(52) U.S. Cl. .......... 715/742; 715/771; 715/749; 715/788; 709/218; 709/219; 709/203; 709/217

(58) Field of Classification Search .......... 715/771, 715/742, 749, 788, 234, 235, 236, 239, 243, 715/744; 709/218, 219, 236, 203, 201, 217
See application file for complete search history.

(56) References Cited

U.S. PATENT DOCUMENTS

| | | | | |
|---|---|---|---|---|
| 2002/0049788 | A1* | 4/2002 | Lipkin et al. | 707/513 |
| 2002/0194267 | A1* | 12/2002 | Flesner et al. | 709/203 |
| 2003/0014442 | A1* | 1/2003 | Shiigi et al. | 707/513 |
| 2003/0167315 | A1* | 9/2003 | Chowdhry et al. | 709/203 |
| 2004/0205555 | A1* | 10/2004 | Hind et al. | 715/513 |
| 2005/0010634 | A1* | 1/2005 | Henderson et al. | 709/201 |
| 2005/0050021 | A1* | 3/2005 | Timmons | 707/3 |
| 2005/0119913 | A1* | 6/2005 | Hornreich et al. | 705/2 |
| 2006/0047728 | A1* | 3/2006 | Kim et al. | 707/205 |
| 2006/0168512 | A1* | 7/2006 | Wilson et al. | 715/513 |
| 2007/0250841 | A1* | 10/2007 | Scahill et al. | 719/320 |

OTHER PUBLICATIONS

Foley, Mary Jo, "Microsoft to Automate 'Avalon' Coding With 'Sparkle'," Nov. 5, 2003, available at http://www.microsoft-watch.com/content/operating_systems/microsoft_to_automate_avalon_coding_with_sparkle.html (last accessed Sep. 2, 2009, verified Oct. 6, 2009).

Griffiths, Ian, "Inside XAML," Jan. 19, 2004, available at http://ondotnet.com/lpt/a/4516 (last accessed Sep. 2, 2009, verified Oct. 6, 2009).

* cited by examiner

*Primary Examiner*—Ba Huynh
*Assistant Examiner*—Rashedul Hassan
(74) *Attorney, Agent, or Firm*—Kilpatrick Stockton LLP (57) ABSTRACT

A data-descriptive meta language file, such as XML, is created that defines the layout operation within the visual interface of a component-based application at runtime. At runtime, the application receives a data-descriptive meta language file that defines the layout operation of the various components within the application visual interface. The application parses the data-descriptive meta language file and uses the parsed information to complete the layout and operation of the rendered interface. The runtime application includes functionality that uses selected data to specify unique applications and/or unique content associated with the application.

32 Claims, 7 Drawing Sheets

400 — layout name My Portal historyManagement true
  401 — view name Home
    402 — region width 20% height 100%
      403 — slot style stack height 10% name Google Search showControls true
               gradientStart 0xA7B9BC gradientEnd 0xD6DFE0 borderColor 0x89A2A5
        404 — pod className pods.EmployeeSearch.GoogleSearch showHeader false
               styleName mainArea1PodStyle titleStyleDeclaration podTitleStyle
               showMore false
               slot
      405 — slot style stack height 375 name Slide Show showControls true
               gradientStart 0xA7B9BC gradientEnd 0xD6DFE0 borderColor 0x89A2A5
        406 — pod className pods.RSS.RSSPicturePod name RSS width 100%
               titleStyleDeclaration smallPodTitleStyle spacerColor 0xff0000
               gradientStart 0xD1BAD1 gradientEnd 0xEADFEA borderColor 0xA778A7
               slot
      407 — slot style stack height 60% name Weather Forecast vScrollPolicy off
               showControls true gradientStart 0xA7B9BC gradientEnd 0xD6DFE0
               borderColor 0x89A2A5
        408 — pod className pods.Weather.Weather zip 94107 showHeader false
               styleName mainArea1PodStyle titleStyleDeclaration podTitleStyle
               showMore false
               slot
           region
    409 — region width 80% height 100%
         - slot height 400 style stack gradientStart 0xA7B9BC gradientEnd 0xD6DFE0
           borderColor #89A2A5 name Headlines
        410 — pod className pods.RSS.RSSPod height 100% name RSS
               titleStyleDeclaration smallPodTitleStyle spacerColor 0xff0000
               slot
      411 — slot style stack height 278 name My Pods showControls true
               gradientStart 0xA7B9BC gradientEnd 0xD6DFE0 borderColor 0x89A2A5
        412 — cluster repeatCount 2

TO FIG. 4B

FIG. 4B  FROM FIG. 4A

413 — pod className pods.EmployeeSearch.HoroscopeSearch name my horoscope horizontalAlign center source assets/sports_02.swf height 100% titleStyleDeclaration smallPodTitleStyleDragable showMore false headerHeight 18 headerColors 0xD6DFE0 spacerColor 0xA7B9BC

414 — pod className pods.ImagePod.DragableImagePod name my restaurants horizontalAlign center source assets/restaurants_01.swf height 100% titleStyleDeclaration smallPodTitleStyleDragable showMore false headerHeight 18 headerColors 0xD6DFE0 spacerColor 0xA7B9BC

415 — pod className pods.Weather.Weather zip 94107 showHeader false styleName mainArea1PodStyle titleStyleDeclaration podTitleStyle showMore false 416 — pod className pods.EmployeeSearch.HoroscopeSearch name my horoscope horizontalAlign center source assets/sports_02.swf height 100% titleStyleDeclaration smallPodTitleStyleDragable showMore false headerHeight 18 headerColors 0xD6DFE0 spacerColor 0xA7B9BC cluster
  slot
 region
view
•
•
•

LAYOUT MANAGEMENT USING DATA-DESCRIPTIVE META LANGUAGE DOCUMENTS

TECHNICAL FIELD

The present invention relates, in general, to computer applications and, more specifically, to management of application layout through data-descriptive meta language documents.

BACKGROUND OF THE INVENTION

Computer applications excel at processing and presenting data to various users for various purposes. As computers and computer applications have advanced and become more readily available, component-based applications have emerged and gained popularity. Component-based applications are computer applications that are made up of multiple, independent or related components that are displayed in a unified interface. Each component typically uses a different data source to supply its presentation. Examples of such component-based applications are Web portals, dashboards, and the like.

Portals are essentially Web-accessible "pages" made up of multiple, independent pods or portlets that are arranged on the page for presentation of information to the portal user. Each pod or portlet generally consumes a data feed that is separate and independent from the data feeds of other pods or portlets. One additional feature of many portals is the user's ability to customize the layout of the pods. On a portal site, the user may rearrange the pods or change the pods or portlets that are displayed in order to customize or personalize the portal.

Portal providers typically establish portal servers to generate the hypertext markup language (HTML) document that makes up the portal that is then downloaded to the client Web browser. The logic to create the collection of pods and portlets, as well as the connections between the pods and the data sources, are typically controlled by the portal server. Once the data is retrieved, the portal server generates the HTML that displays each individual pod or portlet. This completed HTML document is then downloaded to the client Web browser for display. Thus, each time the underlying data changes, or the user decides to change something in the portal that requires a re-rendering of the display, the portal server obtains the new data and generates the new HTML file that represents the change. This request-regeneration process disrupts the flow of the user experience and generally requires the HTML page to be completely re-rendered even if the only data change occurs in a single pod or portlet or only a portion thereof.

Portal standards have only recently been proposed that attempt to define standard Application Programming Interfaces (API) for creating portlets. Standards such as JAVA™ Specification Request (JSR) 168 and Web Services for Remote Portlets (WSRP) define a standard API for creating portlets that maybe used or use data in any JSR 168 and/or WSRP-compliant portal system. Prior to these proposed standards, each version of an application typically used its own portlet API, and each of the various portals required that these portlets be specifically tailored for implementation on that specific portal. However, even with the advent of the JSR 168 and WSRP standards, each such compliant portlet still remains separate from any other portlet within the portal.

Another example of component-based applications, dashboards, are display visual interfaces that present data to users in monitoring-type applications. For example, an industrial Human-Machine Interface (HMI) and Supervisory Control and Data Acquisition (SCADA) applications are software that monitor various sensors in an industrial setting and usually graphically present the measurements or processed measurements in a dashboard on the client computer or monitor. Each component on the dashboard generally receives its data from a different data source. One component may receive data on the temperature from a temperature sensor, which is displayed to the user, while another component receives data on the pressure of another process from a Programmable Logic Controller (PLC) with a sensor that detects pressure, which is displayed to the user in a different manner.

Dashboards for such applications as HMI and SCADA applications typically use static design layouts in the client interface. Thus, the visual display is usually pre-defined by the HMI/SCADA developer and resides on the client interface. The HMI/SCADA application typically only receives a data stream from the associated sensor that is used in the display. The application processes the data and populates the visual display with the resulting information.

BRIEF SUMMARY OF THE INVENTION

The present invention is directed to a system and method for using a data-descriptive meta language, such as XML, to define the layout operation within the visual interface of component-based applications at runtime. At runtime, the application receives a data-descriptive meta language file that defines the layout operation of the various components within the application visual interface. The application parses the data-descriptive meta language file and uses the parsed information to complete the layout and operation of the rendered interface. The runtime application includes functionality that uses selected data to specify unique applications and/or unique content associated with the application.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 4A is a block diagram illustrating a portal system configured according to one embodiment of the present invention;

DETAILED DESCRIPTION OF THE INVENTION

Figure 1A:
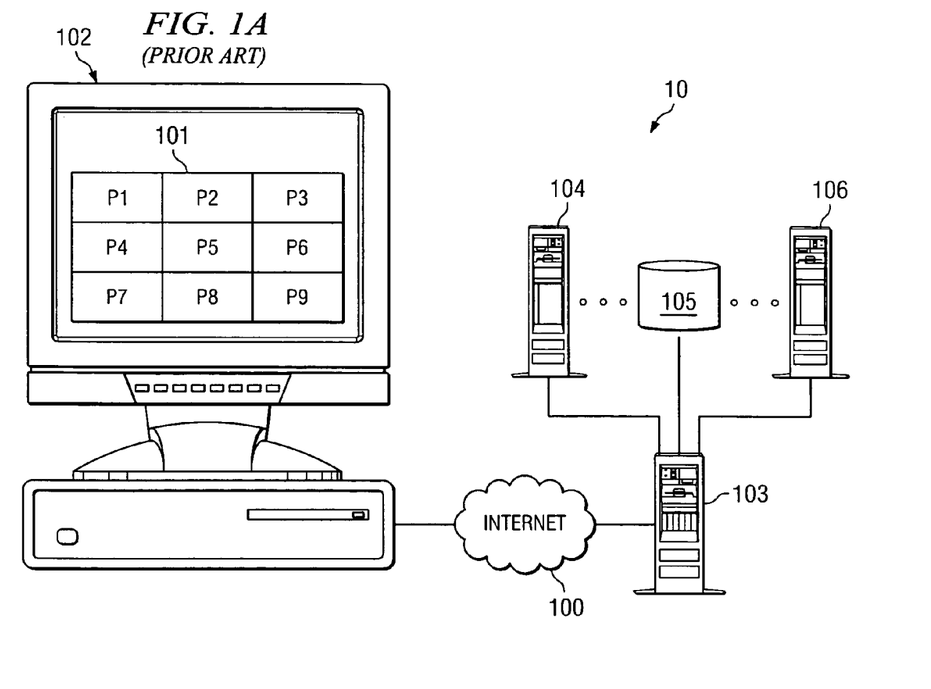
FIG. 1A is a block diagram illustrating a typical portal system.

Before describing the various embodiments of the present invention, it may be helpful to describe the prior art in greater detail. FIG. 1A is a block diagram illustrating portal system 10. In portal system 10, a portal application is presented over Internet 100 to a user at computer 102. The portal is rendered on display 101 and is comprised of the arrangement of portlets P1-P9. The logic and data underlying each portlet is separate and independent from any of the other portlets. Depending on the portal functionality and the user's configuration, portlet P1 may display user email, portlet P2 may display current news events, and so on. The underlying data for portlets P1-P9 originates from various locations, such as back-end servers 104 and 106 and database server 105.

Portal system 10 generates the portlets and pods making up the portals at portal server 103. Portal server 103 gathers information from data sources 104-106 and assembles the portlets which are then arranged onto the viewing canvas as the portal display to be transmitted or downloaded to computer 102. In Web/Internet portals, portal server 103 gathers the various information from data sources 104-106 and generates an HTML page for display on display 101 in the configuration as defined. Therefore, while the data that feeds portlets P1-P9 may be separate as well as the generation and/or creation of the visual portlet representation, a single HTML file/document is generated by portal server 103 that represents the visual appearance of each of portlets P1-P9 as arranged on the portal display. This HTML file may then be downloaded to client computer 102. The HTML document may then be displayed using a Web browser running on computer 102. However, every time data changes or the user desires to change the layout, content, or the like, computer 102 calls back to portal server 103 to regenerate the single HTML page representing the portal. With each round trip, the entire portal display is regenerated and communicated over Internet 100 even if only a single word is changed in one of the portlets. This back-and-forth round-tripping is very inefficient. Moreover, each time the new portal page is received at computer 102, it is regenerated in full onto display 101, which is a time-consuming process.

Figure 1B:
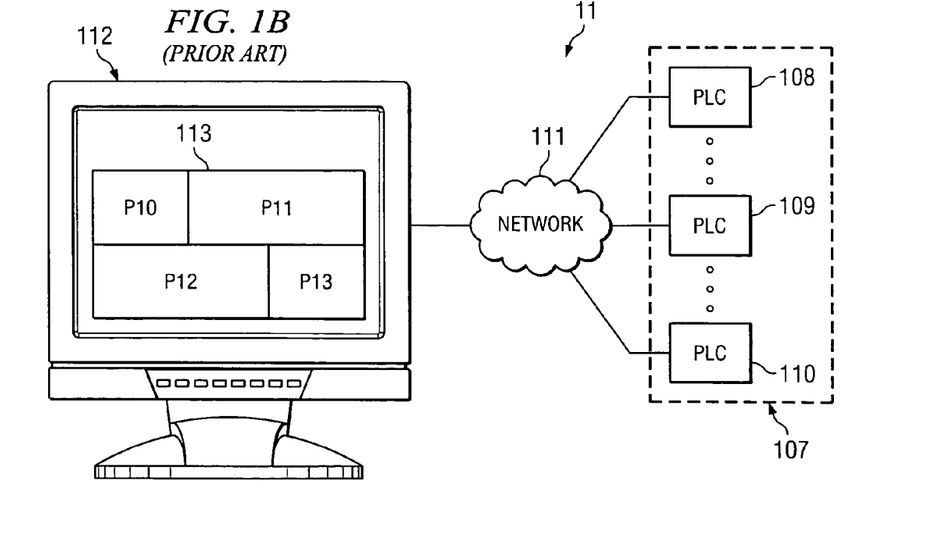
FIG. 1B is a block diagram illustrating a typical HMI system.

FIG. 1B is a block diagram illustrating HMI system 11. HMI system 11 is attached to network 111 that includes multiple programmable logic control (PLC) units, such as PLCs 108-110. PLCs 108-110 are placed in various locations in industrial facility 107. As PCSs 108-110 perform measurements or calculations of events within facility 107, this data is passed over network 111 to monitor 112. Visual representation of this data is then displayed on dashboard 113. HMI system 11 determines how the data will be displayed. However, multiple windows, such as windows P10-P13, are typically used to display the visual representation of the measured data. While each window is fed by data from different sources, HMI system 11 typically generates the entire display for dashboard 113 with this data.

Figure 2:
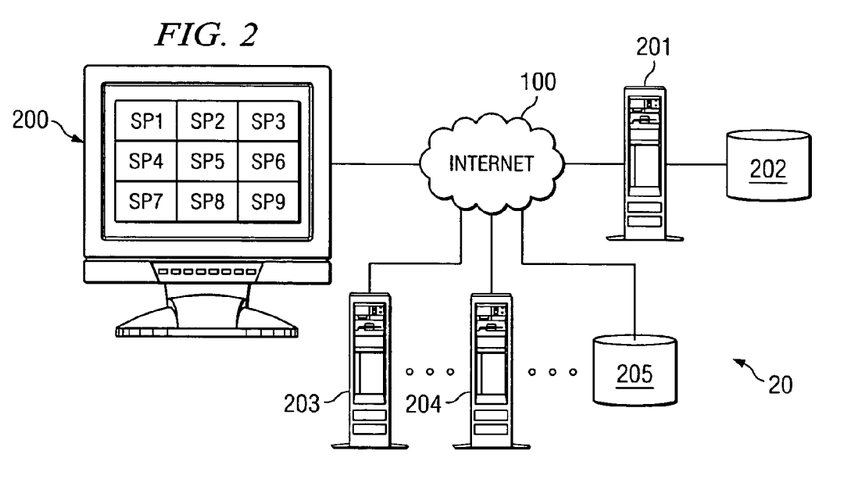
FIG. 2 is a block diagram illustrating a portal system configured according to one embodiment of the present invention.

FIG. 2 is a block diagram illustrating portal system 20 configured according to one embodiment of the present invention. Portal system 20 leverages an interactive multimedia runtime container (iMRC) operating on client computer 200. An example of such an iMRC is Macromedia, Inc.'s, MACROMEDIA FLASH™ player. As the user accesses portal server 201 through a Universal Resource Locator (URL), the portal application is downloaded from portal server 201 over Internet 100 to computer 200 and loaded into the iMRC for operation. The portal application indicates to the iMRC that a source document exists at portal server 201. This source document is created using a data-descriptive meta language, such as XML. The source document follows a standard format that describes not only the appearance of the portal and portlets, but may also contain information about the application and the data sources for each portlet.

The iMRC downloads and parses the source document for the descriptive information that comprises location data, appearance data, class definitions, and the like. This descriptive information is used in the portal application to render the portal layout onto client computer 200. The descriptive information is, therefore, used by the iMRC to execute the portal application. Additionally, because all of the information that controls the visual layout of the entire portal now resides on client computer 200, manipulating the layout may be completed without round-tripping back to portal server 201 to re-build the layout. The source file will determine the layout of portlets SP1-SP9 on client computer 200. Portal server 201 communicates directly with data sources, whether that data source is local to portal server 201, such as database 202, or remote, such as data sources 202-205. When the layout or information for the portal changes, a new source file may be downloaded or pushed onto client computer 200 that the iMRC can then use to refresh the part of the portal, portlet, or pod that changed. Because the source file is created using a data-descriptive meta language, it will be small compared to the size of an entire HTML file that current portal servers send to the user's Web browser.

It should be noted that various alternative and/or additional embodiments of the present invention may be configured such that portals SP1-SP9 communicate directly with their respective data sources. In the embodiment described in FIG. 2, it is advantageous to restrict communication of portals SP1-SP9 with portal server 201 in order to preserve security of the portal system.

It should further be noted that other runtime container applications may be used to implement various embodiments of the present invention. Dynamic HTML (DHTML) is an example of an alternative means for implementing various embodiments of the present invention. Moreover, embodiments of the present invention may be implemented using elements from Microsoft Corporation's pending operating system update currently under development and commercially known as WINDOWSFX™ or Longhorn. Such applicable elements may be the XML-based declarative programming language commercially known as extensible application markup language (XAML), or the animation toolkit commercially known as Sparkle.

Figure 3:
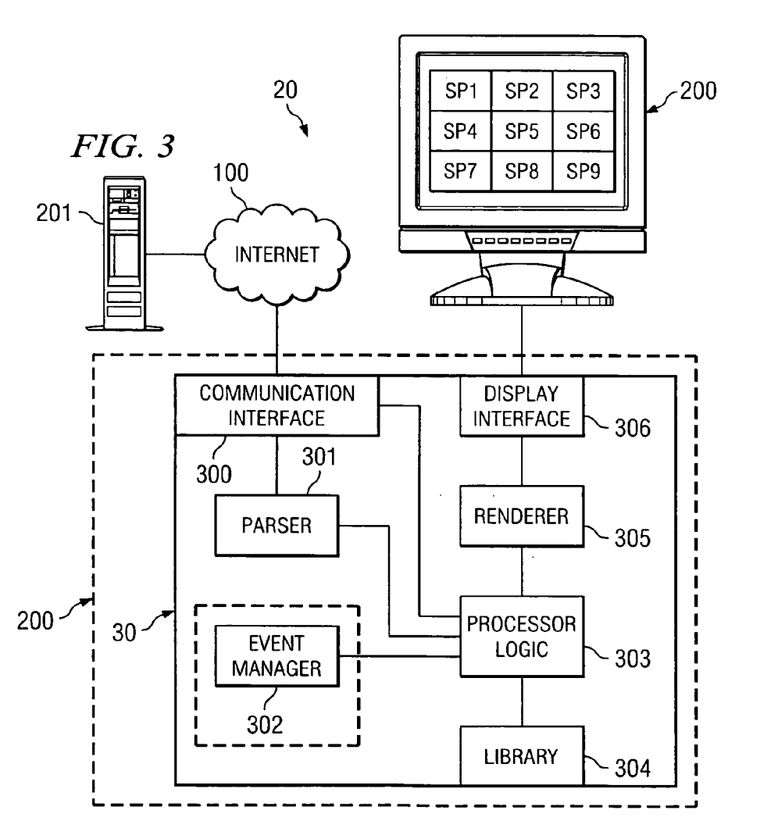
FIG. 3 is a block diagram illustrating an iMRC operating as a part of a portal system configured according to one embodiment of the present invention.

FIG. 3 is a block diagram illustrating iMRC 30 operating as a part of portal system 20 configured according to one embodiment of the present invention. To initiate portal system 20, the user at computer 200 selects a particular URL directed at the portal. Computer 200 accesses portal server 201 via Internet 100 to retrieve the portal application. The portal application initiates iMRC 30 to run within computer 200. Communication interface 300 receives the portal application and begins processing the application at processor logic 303. The portal application signals processor logic 303 that a layout source file is available for the portal on portal server 201. iMRC 30 communicates with portal server 201 through Internet 100 to download the layout source file.

On receipt at computer 200, communication interface 300 passes the file to parser 301. Parser 301 parses out the relevant layout information, such as location data and appearance data, and data source information, such as class names or class data, and passes this information to processor logic 303 to generate the portal. Processor logic 303 uses the information in conjunction with class and other definitions in library 304 to create the various portlet instances. For example, some of the parsed layout information may comprise class names for the various portlets or pods. The class definitions, found in library 304, define the type of data that will be consumed, where that data may come from, how to connect with the data source, what to do with the data once it is received, and other such information.

As each portlet is generated, it registers itself with event manager 302. Through registration, the portlets register both the data or events that it listens for and any data or events that it generates. A portlet class may be programmed to process data from a particular data source and produce a result event. By centralizing the management of the different portlet events, the portlets are capable of communicating with each other or, at least, share or coordinate data. For example, if two or more portlets listen for the same data, event manager 302 will direct the content managers to connect to the data source and distribute the same data to both portlets. Developers may also view what events are available from other portlets that may be used as input to portlets that they may create. Furthermore, one portlet may listen for weather data coming from a particular data source and produce an event that comprises data for a visual weather information display. A second portlet may listen for the weather information event produced by the first portlet to further produce a visual display of historic weather data. Thus, the portlets communicate data with each other.

After processor logic 303 completes generating the portlet instances using the data from the data sources and any intervening or subsequent events, the supporting information is passed to renderer 305 which generates the instructions necessary to instruct display interface 306 to display the collection of portlets in the layout defined by the layout source file. The visual representation of the portal is then rendered onto the display of computer 200.

Figure 4B:
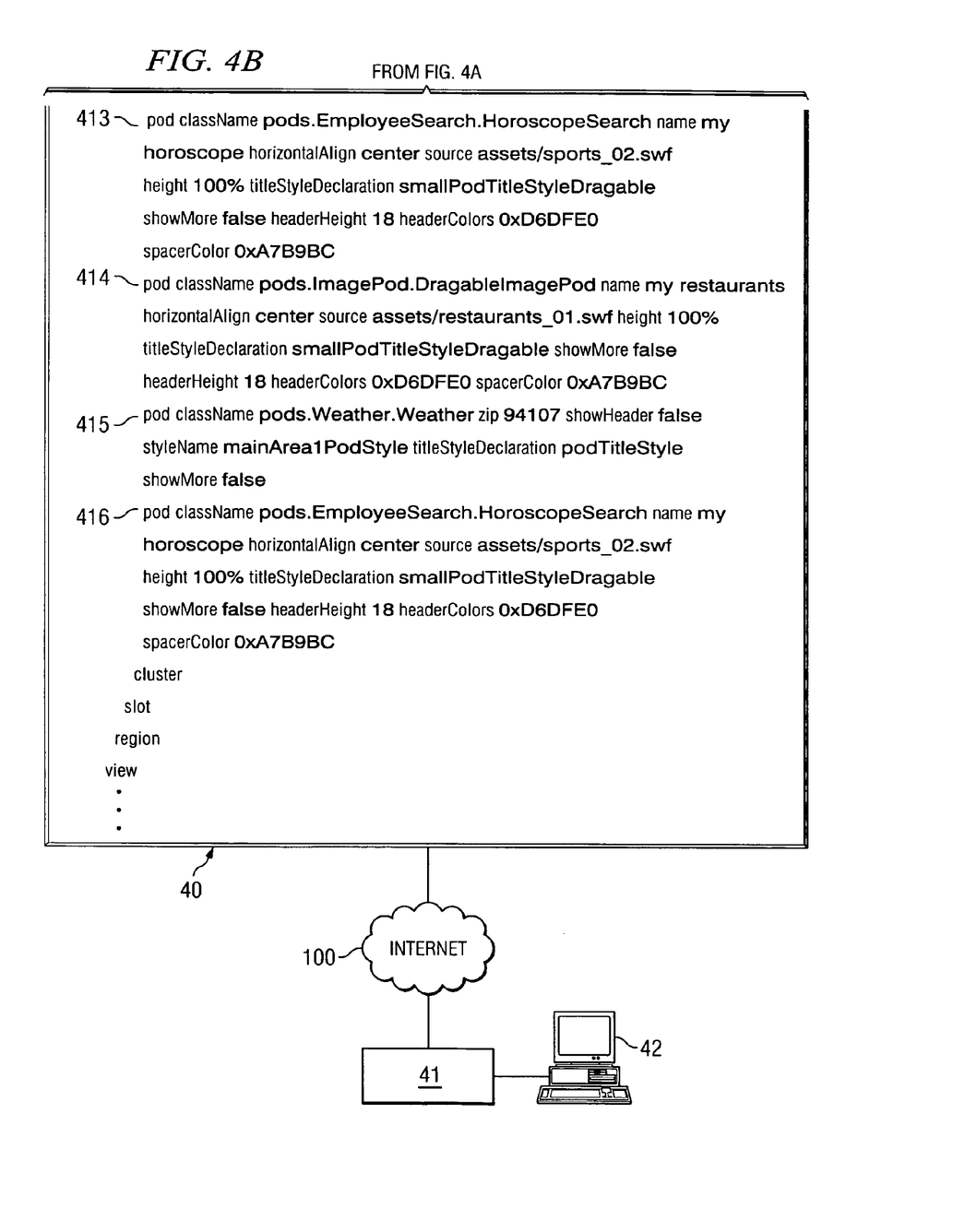
FIG. 4B is a block diagram continuing the portal system depicted in FIG. 4A.

FIGS. 4A and 4B are block diagrams illustrating a portal system configured according to one embodiment of the present invention. Layout file 40 is an XML file also configured according to one embodiment of the present invention. The XML includes special tags that are defined for use in the inventive portal system. In displaying the requested portal, computer 42 (FIG. 4B) downloads layout file 40 over Internet 100 (FIG. 4B). Portal application 41 (FIG. 4B), running on computer 42 (FIG. 4B), parses layout file 40 and assembles the defined pods to create the portal display.

Layout file 40 illustrates the manner in which the XML defines the layout of the portal and various pods making up the portal. The hierarchy of XML tags define views, regions, slots, clusters, and the like. In the illustrated example, views represent the entire portal view, regions define divisions of the views, slots define divisions of the regions, and clusters define an assembly of multiple pods arranged within a slot. The various views and slots may be arranged in the z-space such that pods may be obscured until selected to be active. Additional XML tags are defined that control the location of the divisions, size, color, and the like. Moreover, specialized XML tags define the class of the pods to be created. This information is used by portal application 41 to assemble the portal for display on computer 42 (FIG. 4B).

Figure 4C:
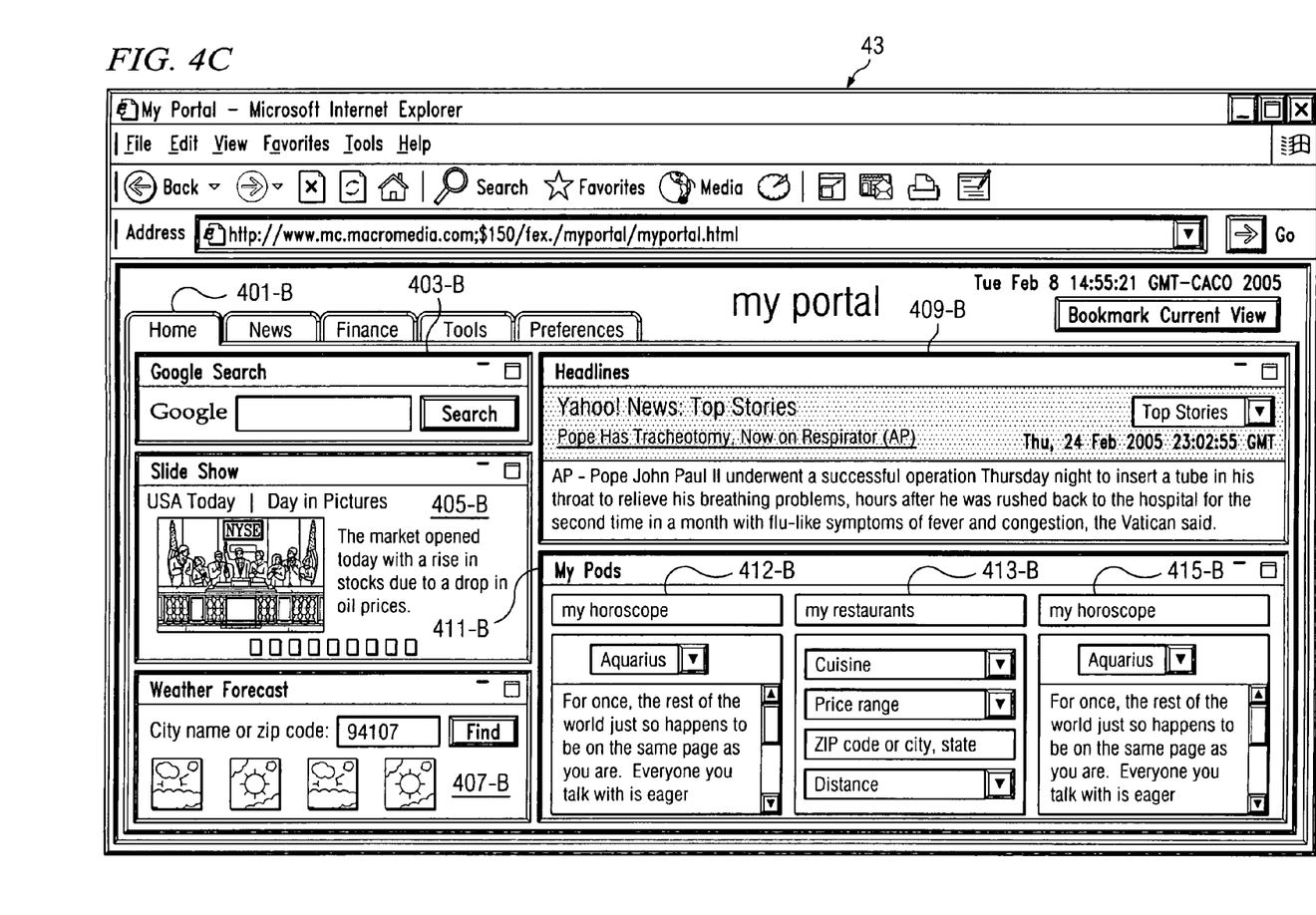
FIG. 4C is a screenshot illustrating a portal display rendered on the computer from FIGS. 4A and 4B.

FIG. 4C is a screenshot illustrating portal display 43 rendered on computer 42 from FIGS. 4A and 4B. Portal display 43 is rendered in a typical Web browser running on computer 42 (FIG. 4A). Layout file 40 (FIG. 4A) defines the layout of portal display 43. Layout tag 400 (FIG. 4A) defines the layout for portal display 43. The views within portal display 43, controlled by the tabs at the top of the display are also each defined within layout file 40 (FIG. 4A). The current window, home view 401-B, is defined by view tag 401 (FIG. 4A). View tag 401 defines the height, width, position, and the like. Region and slot tags then define the various divisions within view tag 401. Slot tag 403 (FIG. 4A), within region tag 402 (FIG. 4A), defines the layout and definition of search pod 403-B.

When creating search pod 403-B, portal application 41 (FIG. 4A) uses its internal library to create the pod using pod class name tag 404 (FIG. 4A). The pod class name, "pods.EmployeeSearch.GoogleSearch," is defined within the library to set up any input/output (I/O) for the pod, any data sources, and the like. Portal application 41 (FIG. 4B) uses this information to set up connections with the data source and populate the pod variables with the data and render the completed pod.

Slide show pod 405-B is defined by slot tag 405 (FIG. 4A) including pod class 406 to define the functionality and data used and produced by slide show pod 405-B. Weather forecast pod 407-B is defined by slot tag 407 (FIG. 4A) with functionality defined by pod class 408. Headlines pod 409-B is defined by slot tag 409 (FIG. 4A) within a new region and with the functionality of pod class 410. My pods section 411-B is defined by slot tag 411 (FIG. 4A) which includes further subdivisions of cluster tag 412 (FIG. 4A). The various pods included within the cluster, first horoscope pod 412-B, restaurant pod 413-B, and second horoscope pod 415-B, are defined by pod classes 413-416 (FIG. 4B). Thus, the simple and small-size of layout file 40 is capable of defining the entire layout of portal display 43. New versions may be downloaded and/or pushed to the client computers very quickly and without requiring much overhead on the client computer.

It should be noted that in various additional and/or alternative embodiments of the present invention, users may configure the display of the portal by dragging the different pods or portlets to desired locations, or using an interface mechanism to design new pods or portlets with desired content. As the user customizes his or her portal display, the data-descriptive metadata file of layout file 40 (FIGS. 4A and 4B) or the layout source file may be updated and stored locally for use by the user or returned to the portal server to be saved and associated with the particular user. Therefore, the next time the user accesses the portal, his or her customized portal layout source file will be used to generate the portal display. Moreover, because the source file is a relatively small size, it does not take up a great deal of memory resources where ever it is maintained.

Figure 5:
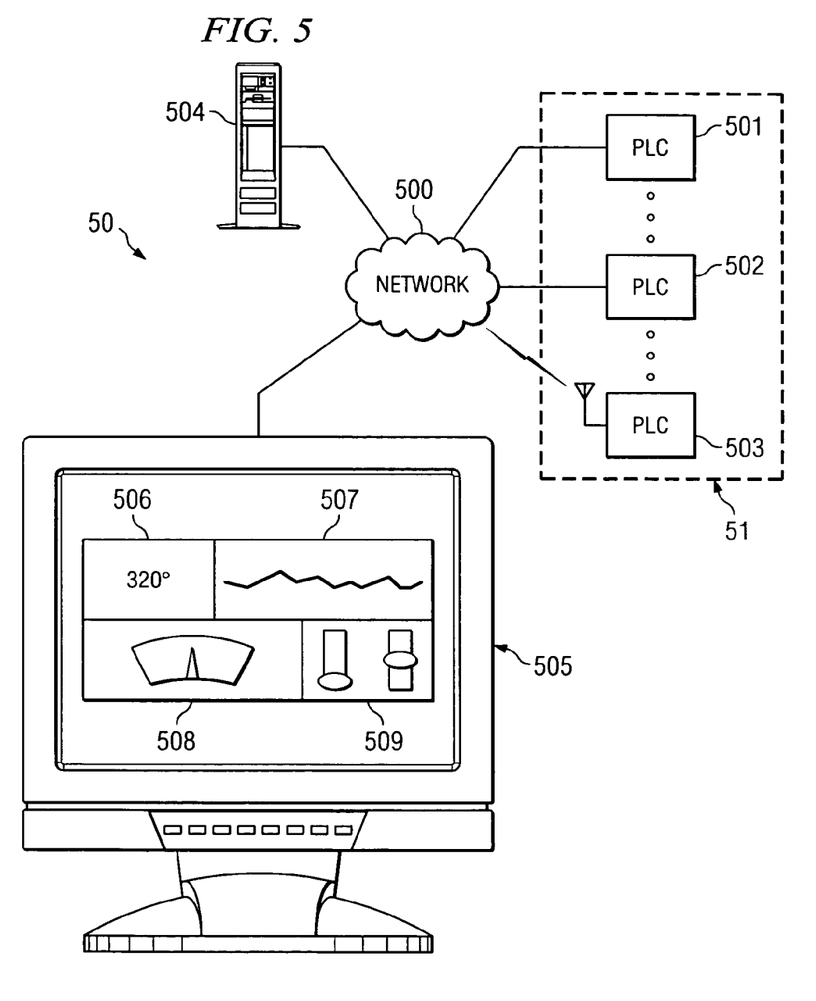
FIG. 5 is a block diagram illustrating an HMI system configured according to one embodiment of the present invention.

FIG. 5 is a block diagram illustrating HMI system 50 configured according to one embodiment of the present invention. HMI system 50 includes multiple PLCs, PLCs 501-503, distributed around facility 51 for performing some task and communicating some information into network 500. HMI server 504 processes all of the information gathered by PLCs 501-503 and displays this information in a dashboard presented on display 505. In the embodiment described herein, a layout source file is created on HMI server 504 that is downloaded to display 505 in order to display the pods which display some aspect of the gathered information. For example, pod 506 displays a current temperature of a facility or process location. Pod 507 displays an historical graph of temperatures for the location, while pods 508 and 509 display a pressure gauge and slider controllers, respectively. Pods are capable of receiving input from the user, such that a technician may manipulate the slider controls displayed in pod 509 to affect some change within facility 51. The layout of the dashboard may be changed or customized by the technicians or plant managers and saved to a data descriptive metadata source file. This source file may be maintained at HMI server 504 or locally on display 505. This inventive configurability allows customization of the dashboard without requiring great resources or memory overhead.

Figure 6:
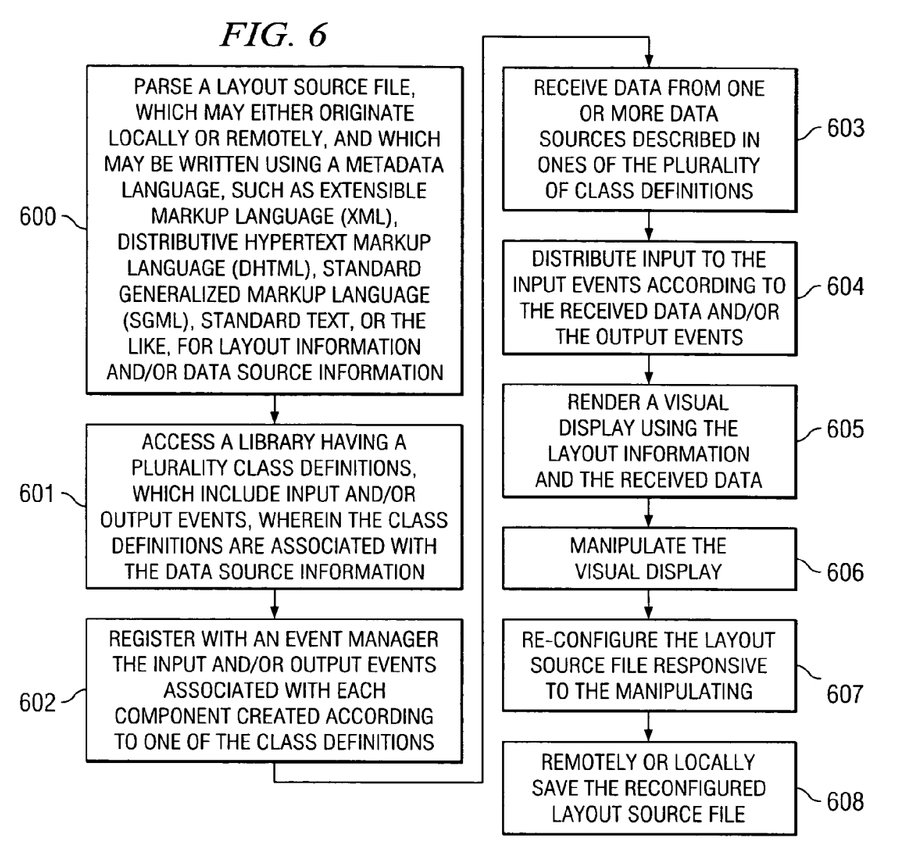
FIG. 6 is a flowchart illustrating example steps executed in implementing one embodiment of the present invention.

FIG. 6 is a flowchart illustrating example steps executed in implementing one embodiment of the present invention. In step 600, a layout source file, which may either originate locally or remotely, and which may be written using a metadata language, such as extensible markup language (XML), distributive hypertext markup language (DHTML), standard generalized markup language (SGML), standard text, or the like, is parsed for layout information and/or data source information. A library is accessed, in step 601, having a plurality class definitions, which include input and/or output events, wherein the class definitions are associated with the data source information. The input and/or output events associated with each component created according to one of the class definitions are registered, in step 602, with an event manager. Data from one or more data sources described in ones of the plurality of class definitions is received in step 603. Input is distributed, in step 604, to the input events according to the received data and/or the output events. In step 605, a visual display is rendered using the layout information and the received data.

In alternative embodiments of the present invention, users may customize the visual display by manipulating the visual elements. In optional step 606, the visual display is manipulated. The layout source file is re-configured, in optional step 607, responsive to the manipulating. In optional step 608, the reconfigured layout source file is either locally or remotely stored for future use.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 7:
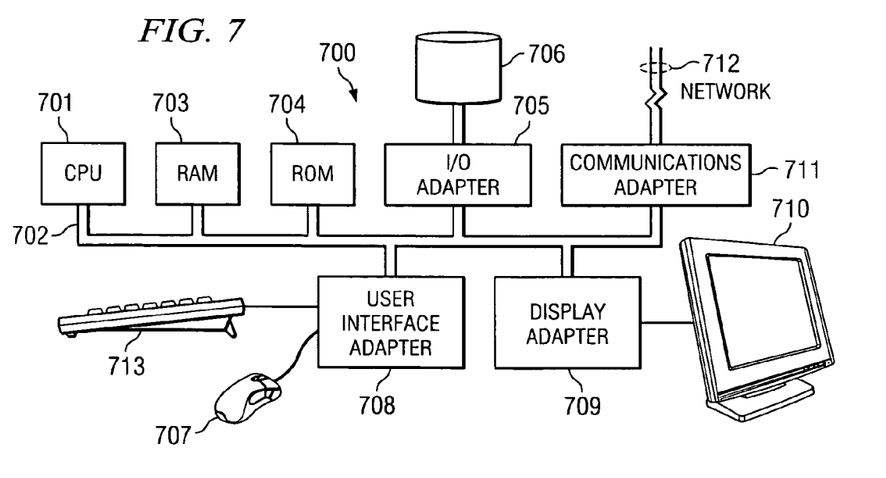
FIG. 7 illustrates a computer system adapted to use embodiments of the present invention.

FIG. 7 illustrates computer system 700 adapted to use embodiments of the present invention, e.g. storing and/or executing software associated with the embodiments. Central processing unit (CPU) 701 is coupled to system bus 702. The CPU 701 may be any general purpose CPU. However, embodiments of the present invention are not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) controller card 705, communications adapter card 711, user interface card 708, and display card 709. The I/O adapter card 705 connects storage devices 706, such as one or more of a hard drive, a CD drive, a floppy disk drive, a tape drive, to computer system 700. The I/O adapter 705 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 711 is adapted to couple the computer system 700 to a network 712, which may be one or more of a telephone network, a local (LAN) and/or a wide-area (WAN) network, an Ethernet network, and/or the Internet network. User interface card 708 couples user input devices, such as keyboard 713, pointing device 707, and the like, to the computer system 700. The display card 709 is driven by CPU 701 to control the display on display device 710.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer implemented method comprising:

receiving a portal application;

after receiving the portal application and in response to receiving the portal application, executing the portal application in a runtime container, the portal application defining presentation of a plurality of portlets on a computer display, wherein each one of said plurality of portlets operates separately and independently from each other of said plurality of portlets, wherein executing the portal application comprises:

after executing begins, accessing a layout source file, the layout source file comprising a separate content item from the portal application;

parsing the layout source file for layout information and data source information for said plurality of portlets, wherein said layout source file is associated with said portal application;

accessing a library on a storage device having a plurality of class definitions associated with said data source information;

receiving data from one or more data sources described in ones of said plurality of class definitions;

rendering a visual display on said computer display using said layout information and said received data; and in response to receiving update data for a portlet of said plurality of portlets, re-rendering said portlet of said plurality of portlets within said visual display using said update data, wherein remaining ones of said plurality of portlets are not re-rendered.

2. The method of claim 1 wherein each of said plurality of class definitions include one or more of: one or more input events; and one or more output events.

3. The method of claim 2 further comprising:
registering one or more of:
said one or more input events; and
said one or more output events
with an event manager.

4. The method of claim 2 further comprising:
distributing input to said one or more input events according to at least one of:
said received data; and
said one or more output events.

5. The method of claim 1 further comprising:
downloading said layout source file from a remote location prior to accessing the layout source file.

6. The method of claim 1 further comprising:
manipulating said visual display;
re-configuring said layout source file responsive to said manipulating; and
saving said reconfigured layout source file.

7. The method of claim 6 wherein said saving comprises one or more of:
saving on remote storage; and
saving on local storage.

8. The method of claim 1 wherein said layout source file is written using a metadata language.

9. The method of claim 8 wherein said metadata language comprises one or more of:
extensible markup language (XML);
distributive hypertext markup language (DHTML);
standard generalized markup language (SGML); and
standard text.

10. A computer implemented method comprising:
executing a portal application using a runtime container in response to receiving the portal application, the portal application configured to display a plurality of components on a display, wherein executing comprises:
after executing begins, accessing a source file, the source file separate from the portal application;
parsing the source file for:
component location data for each of said plurality,
component appearance data for each of said plurality, and
component class data for each of said plurality;
retrieving component data from a data source defined in component data management information, wherein said component data management information is obtained from a component library stored on a storage device and accessible using said component class data;

creating each of said plurality of components using one or more of associated component class data and said retrieved component data;

rendering each of said created plurality of components on said display according to said component location data and said component appearance data; and in response to receiving update data for a portlet of said plurality of portlets, re-rendering said portlet of said plurality of portlets on said display without re-rendering remaining ones of said plurality of portlets.

11. The method of claim 10 further comprising:
downloading said source file from a remote location prior to accessing said source file.

12. The method of claim 10 wherein said component library includes one or more of:
input event data; and
output event data for each of said plurality of components indexed according to said component class data.

13. The method of claim 12 further comprising:
registering with an event manager one or more of said input event data and said output event data for each of said plurality of components.

14. The method of claim 12 wherein said creating includes:
distributing said retrieved component data according to said input event data; and
retrieving said output event data from one or more of said plurality of components according to said input event data for ones of said plurality of components.

15. The method of claim 10 further comprising:
changing one or more of said plurality of components displayed on said display;
amending one or more of: component location data; component appearance data; and component class data responsive to said changing.

16. The method of claim 15 further comprising:
locally storing said amended source file; and
remotely storing said amended source file.

17. A computer program product having a non-transitory computer readable medium with computer program logic recorded thereon, said computer program product comprising:
code for executing a portal application in a runtime container in response to receiving the portal application, the portal application defining presentation of a plurality of portlets on a computer display, wherein each one of said plurality of portlets operates separately and independently from each other of said plurality of portlets, wherein the code for executing comprises:
code for accessing a layout source file in response to executing the portal application, the layout source file comprising a content item separate from the portal application;
code for parsing the layout source file for layout information and data source information for said plurality of portlets;
code for accessing a library on a storage device having a plurality class definitions associated with said data source information;
code for receiving data from one or more data sources described in ones of said plurality of class definitions;
code for rendering a visual display on said computer display using said layout information and said received data; and
code for re-rendering a specified portlet within said visual display without re-rendering remaining ones of said portlets in response to receiving update data directed to said specified portlet of said plurality of portlets.

18. The computer program product of claim 17 wherein each of said plurality of class definitions include one or more of:
   one or more input events; and
   one or more output events.

19. The computer program product of claim 18 further comprising:
   code for registering one or more of:
   said one or more input events; and
   said one or more output events with an event manager.

20. The computer program product of claim 18 further comprising:
   code for distributing input to said one or more input events according to at least one of: said received data; and said one or more output events.

21. The computer program product of claim 17, wherein the code for executing the portal application further comprises:
   code for downloading said layout source file from a remote location prior to accessing said layout source file.

22. The computer program product of claim 17 further comprising:
   code for manipulating said visual display;
   code for re-configuring said layout source file responsive to execution of said code for manipulating; and
   code for saving said reconfigured layout source file.

23. The computer program product of claim 22 wherein said code for saving comprises one or more of: code for saving on remote storage; and code for saving on local storage.

24. The computer program product of claim 17 wherein said layout source file is written using a metadata language.

25. The computer program product of claim 24 wherein said metadata language comprises one or more of:
   extensible markup language (XML);
   distributive hypertext markup language (DHTML);
   standard generalized markup language (SGML); and
   standard text.

26. The computer program product set forth in claim 17, wherein the non-transitory computer-readable medium comprises a storage device.

27. A system comprising:
   a central processing unit (CPU);
   a storage device coupled to said CPU;
   a display device coupled to said CPU;
   a communication interface coupled to said CPU;
   a parser stored on said storage device; and
   a runtime container stored on said storage device;
   wherein said communication interface is configured to receive a portal application from a portal server;
   wherein, in response to receiving said portal application, said CPU is configured to execute said runtime container after receiving said portal application;
   wherein, in response to said execution, said runtime container is configured to run said portal application and retrieve a layout source file from said portal server, said layout source file being a separate content item from the portal application;
   wherein, on receipt of said layout source file, said CPU executes said parser to parse said layout source file for:
   portlet location data for each of a plurality of portlets;
   portlet appearance data for each of said plurality of portlets; and
   portlet class data for each of said plurality of portlets;
   wherein, using said portlet class data, said portal application configures said communication interface to retrieve portlet data from a data source defined by portlet data management information obtained from a class library accessible using said portlet class data;
   wherein said portal application configures said display device to render each of said plurality of portlets on said display device according to said portlet location data, said portlet appearance data, and said portlet data; and
   wherein, in response to receiving update data from said data source directed at a portlet of said plurality of portlets, said portal application configures said display device to re-render said portlet using said update data without re-rendering remaining ones of said plurality of portlets.

28. The system of claim 27 further comprising:
   a user input device coupled to said CPU, wherein said user input device is configured to receive a uniform resource locator (URL) from a user, wherein said URL provides access information for said portal server to retrieve said portal application.

29. The system of claim 27 wherein said class library includes one or more of:
   input event data; and
   output event data for each of said plurality of portlets indexed according to said portlet class data.

30. The system of claim 29 wherein said portal application is configured to register with an event manager one or more of said input event data and said output event data for each of said plurality of portlets.

31. The system of claim 29 wherein said portal application is configured to distribute said retrieved portlet data according to said input event data; and retrieve said output event data from one or more of said plurality of portlets according to said input event data for ones of said plurality of portlets.

32. The system of claim 27 wherein said portal application is configured to change one or more of said plurality of portlets displayed on said display device including amending one or more of:
   portlet location data;
   portlet appearance data; and
   portlet class data responsive to said change.

* * * * *